(12) United States Patent
Clark

(10) Patent No.: US 9,821,699 B2
(45) Date of Patent: Nov. 21, 2017

(54) LIFT DECK ASSEMBLY FOR A TRUCK

(71) Applicant: Laurie Clark, Brandon (CA)

(72) Inventor: Laurie Clark, Brandon (CA)

( * ) Notice: Subject to any disclaimer, the term of this patent is extended or adjusted under 35 U.S.C. 154(b) by 0 days.

(21) Appl. No.: 14/969,960

(22) Filed: Dec. 15, 2015

(65) Prior Publication Data

US 2016/0185272 A1 Jun. 30, 2016

(30) Foreign Application Priority Data

Dec. 17, 2014 (CA) ...................... 2874929

(51) Int. Cl.
*B60P 1/43* (2006.01)
*B60P 1/44* (2006.01)
*B60P 1/64* (2006.01)

(52) U.S. Cl.
CPC ............. *B60P 1/433* (2013.01); *B60P 1/4407* (2013.01); *B60P 1/4492* (2013.01); *B60P 1/6463* (2013.01)

(58) Field of Classification Search
CPC B60P 1/32; B60P 1/433; B60P 1/4407; B60P 1/4492
See application file for complete search history.

(56) References Cited

U.S. PATENT DOCUMENTS

| | | | |
|---|---|---|---|
| 3,446,534 A * | 5/1969 | King | B60P 1/32 298/1 A |
| 6,152,674 A | 11/2000 | Ogrodnick | |
| 6,457,931 B1 | 10/2002 | Chapman | |
| 6,491,331 B1 | 12/2002 | Fox | |
| 6,533,337 B1 * | 3/2003 | Harshman | B60P 1/43 224/403 |
| 7,300,239 B2 | 11/2007 | Benedikt | |
| 7,381,019 B1 | 6/2008 | Boice | |
| 7,488,025 B1 * | 2/2009 | Roberson | B60P 1/433 296/61 |
| 8,061,754 B1 * | 11/2011 | Webb | B60P 1/43 14/71.1 |
| 8,075,033 B1 * | 12/2011 | McElroy | B60P 1/433 119/406 |
| 2002/0164239 A1 * | 11/2002 | Angermeier | B60P 1/16 414/480 |
| 2008/0159838 A1 * | 7/2008 | Sherer | B60P 1/435 414/537 |
| 2008/0292439 A1 * | 11/2008 | Dunkel | B60P 1/433 414/537 |

(Continued)

*Primary Examiner* — Anna Momper
*Assistant Examiner* — Ashley Romano
(74) *Attorney, Agent, or Firm* — Ryan W. Dupuis; Kyle R. Satterthwaite; Ade & Company Inc.

(57) ABSTRACT

A lift deck assembly has a base frame mounted in the cargo box of a truck and a load supporting platform movable relative to the base frame by a linkage between a loading position substantially at ground level and a transport position above the cargo box in which the side edges of the platform are aligned with the sidewalls of the cargo box and the rear edge of the platform is aligned with the tailgate to provide the general appearance of a tonneau cover. The platform includes a main defining the side edges and an extendable portion that can be extended rearward from the main portion to assist in supporting a load thereon. The extendible portion can be retracted so that the rear edge thereof aligns with the rear edge of the main portion and the tailgate.

16 Claims, 7 Drawing Sheets

(56) References Cited

U.S. PATENT DOCUMENTS

| | | | |
|---|---|---|---|
| 2010/0266378 A1* | 10/2010 | Verwys | B60P 1/433 414/537 |
| 2012/0009050 A1* | 1/2012 | Pepin | B60P 1/435 414/537 |
| 2012/0204360 A1* | 8/2012 | Chamoun | B62D 63/061 14/2.4 |
| 2013/0230374 A1 | 9/2013 | Kerkvliet | |
| 2014/0328658 A1* | 11/2014 | Verwys | B60P 3/06 414/537 |
| 2017/0036588 A1* | 2/2017 | Nicol S Gil | B60P 3/122 |

* cited by examiner

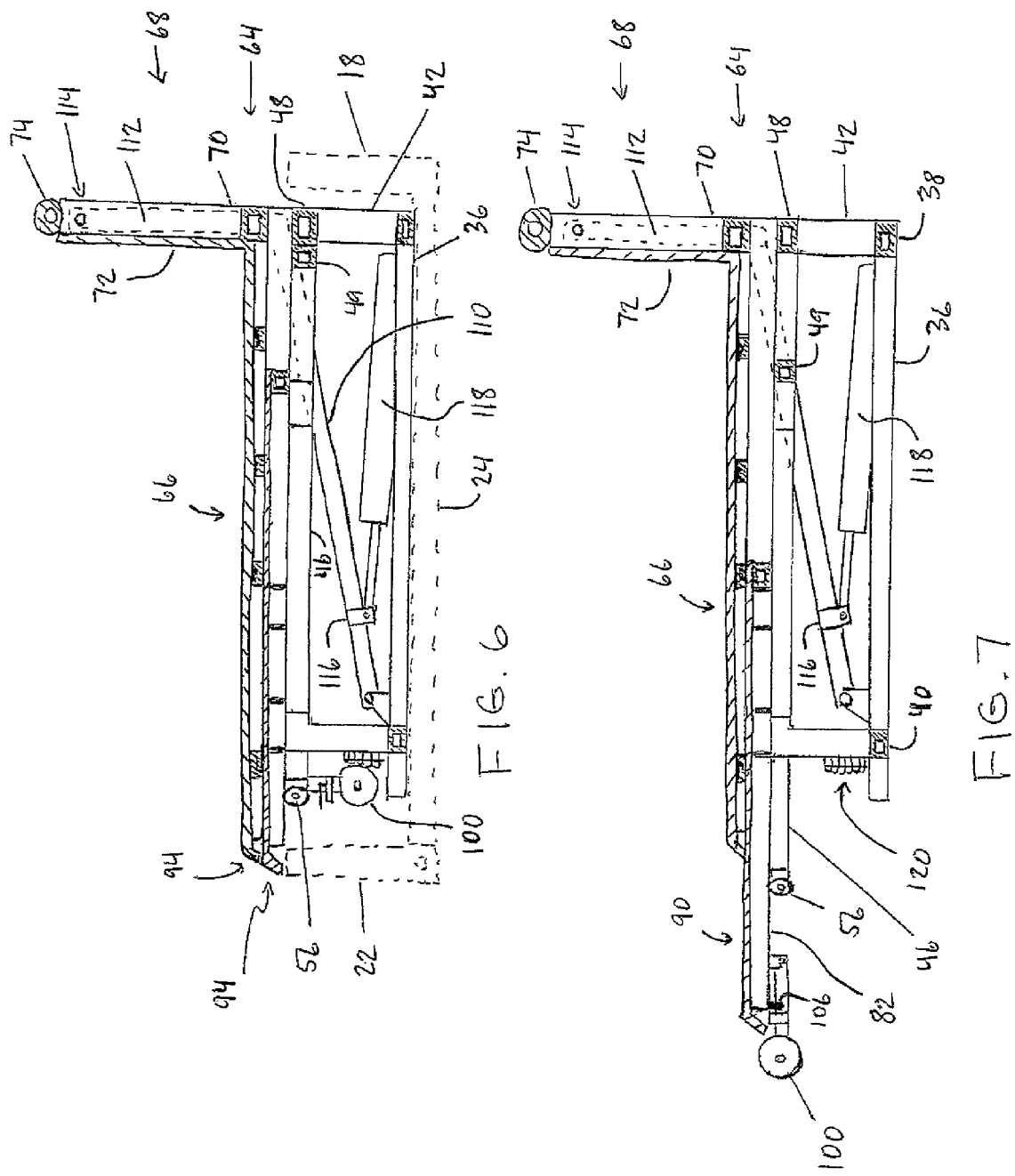

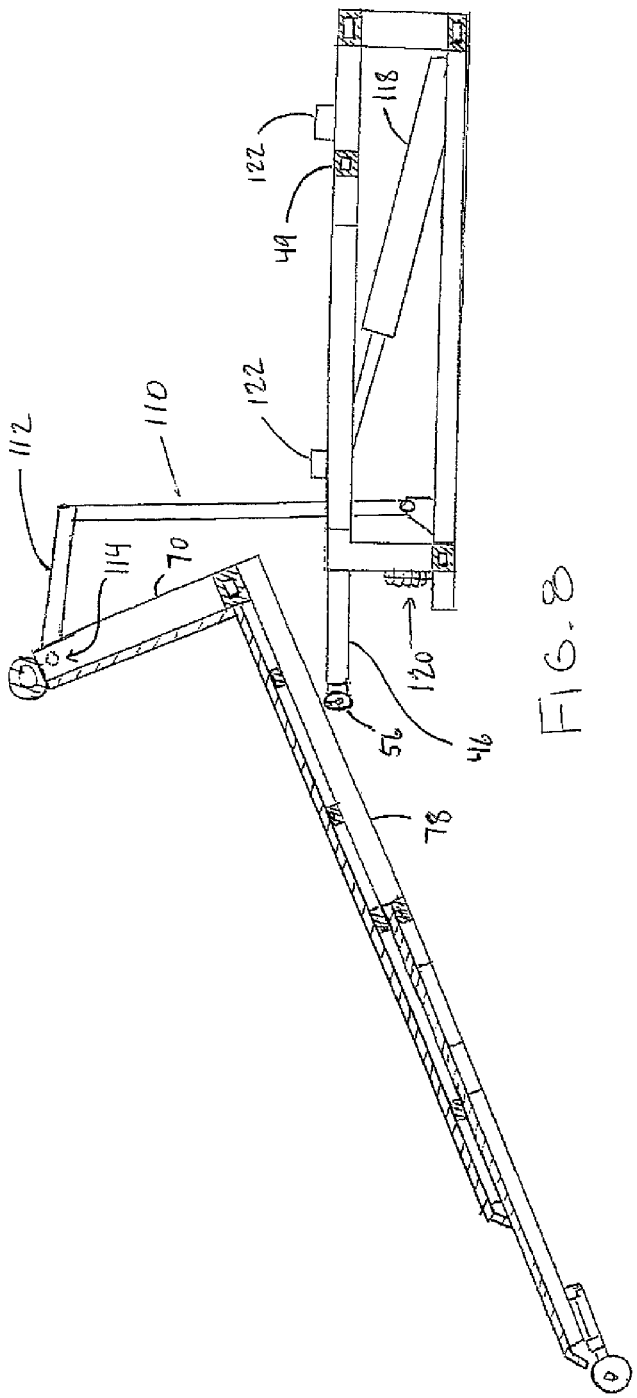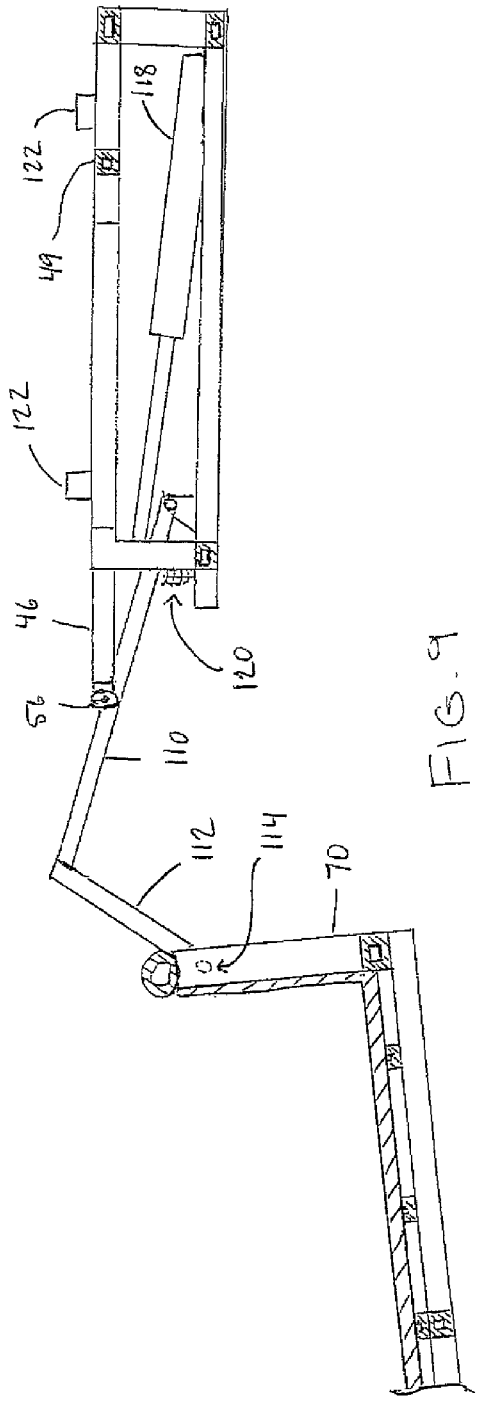

LIFT DECK ASSEMBLY FOR A TRUCK

This application claims foreign priority benefits from Canadian Patent Application 2,874,929, filed Dec. 17, 2014.

FIELD OF THE INVENTION

The present invention relates to a lift deck assembly for use with a truck box of the type including a platform which is lifted from a ground level loading position rearward of the truck box to a transport position supported above the truck box.

BACKGROUND

A common type of passenger vehicle often referred to as a pickup truck is typically provided with a cargo box at the rear end thereof which is known to be useful for transporting various objects therein. Various accessories are known to assist in loading and unloading larger objects, including personal vehicles such as snowmobiles, ATV's and riding mowers, into and out of the truck box.

Various examples of devices suited for loading or unloading truck boxes are described in U.S. Pat. No. 7,300,239 by Benedikt, U.S. Pat. No. 6,152,674 by Ogrodnick, U.S. Pat. No. 7,381,019 by Boice, and U.S. Pat. No. 6,457,931 by Chapman, as well as US Publication 2013/0230374 by Kerkvliet. In each instance, a deck surface is lifted from a ground level loading position rearward of the truck to a raised position within or above the truck box. Such decks however are commonly large and unaesthetically pleasing in appearance, particularly when mounted on short truck boxes, as the deck often extends rearward beyond the rear edge of the truck box resulting in a hazardous protruding component even when not in use for supporting cargo thereon.

U.S. Pat. No. 6,491,331 by Fox discloses an extendable cargo deck for a truck box which can be retracted within the perimeter of the cargo box when not in use, however, no means are provided for loading cargo from ground level.

SUMMARY OF THE INVENTION

According to one aspect of the invention there is provided a lift deck assembly for a truck having a cargo box with laterally opposed sidewalls extending longitudinally between a front of the cargo box and a tailgate at a rear of the cargo box, the assembly comprising:

a platform extending laterally between two side edges and longitudinally between opposite front and rear edges and being arranged to support a load thereon, a base frame arranged for anchoring in fixed relation to the cargo box, an operating linkage coupled between the base frame and the platform such that the platform is arranged to be moveable from a loading position substantially at ground level to a transport position above the cargo box wherein the side edges of the platform are aligned with the sidewalls of the cargo box and the rear edge of the platform is aligned with the tailgate.

By providing a platform which is arranged to be supported above the cargo box in a transport position and which includes perimeter edges which align with corresponding edges of the side walls and tailgate of the cargo box, the resulting lift deck assembly has a platform which has the general appearance of a tonneau cover which is much more aesthetically pleasing than various prior art configurations of lift assemblies for truck boxes. Furthermore, the platform is suitably arranged to fully enclose the open top side of the cargo box similarly to a tonneau cover such that the tailgate remains operational between opened and closed positions in the transport position of the platform in the stored configuration thereof so that the cargo area is still useful for containing cargo therein as desired.

Preferably the platform has a base frame portion coupled to the operating linkage and a sheet above the base frame portion, in which the sheet has a smooth, continuous, and uninterrupted surface spanning between the two side edges of the platform such that the cargo box is enclosed in the transport position.

Preferably the platform comprises a frame having a base frame portion coupled to the operating linkage and a head frame portion extending upwards from the base frame portion at the front edge of the platform, in which the head frame portion has a panel configured to conceal the operating linkage in the transport position. Preferably the panel spans the full width of the cargo box.

Preferably the platform has a roller proximate the rear edge thereof and the roller is moveable between a working position such that the roller is arranged to roll on the ground as the platform is displaced towards the loading position and a stored position in which the roller is recessed relative to the rear edge of the platform.

Preferably the base frame has a roller proximate a rear end thereof and the roller is moveable between a working position arranged for rolling engagement with the platform so as to support the platform thereon as the platform is displaced towards the transport position and a stored position in which the roller is recessed relative to the working position. Preferably in the stored position the roller is recessed relative to the rear of the cargo box.

Preferably the base frame has guide surfaces arranged for engaging the platform so as to guide the platform to a central position relative to the cargo box as the platform is displaced towards the transport position.

Preferably the platform has a main portion defining the side edges and an extendable portion, in which the extendable portion is moveable relative to the main portion between a retracted position and an extended position that extends rearward from the main portion so as to be further rearward than in the retracted position. Preferably the extendable portion is arranged to support at least a portion of the load thereon in the extended position.

According to a second aspect of the present invention there is provided a lift deck assembly for a truck having a cargo area, the assembly comprising:

a platform extending laterally between two side edges and longitudinally between opposite front and rear edges and being arranged to support a load thereon, the platform having a main portion defining the side edges and an extendable portion, the extendable portion being moveable relative to the main portion between a retracted position and an extended position that extends rearward from the main portion so as to be further rearward than in the retracted position, the extendable portion being arranged to support at least a portion of the load thereon in the extended position, a base frame arranged for anchoring in fixed relation to the cargo area, and an operating linkage coupled between the base frame and the platform for moving the platform from a transport position above the cargo area to a loading position substantially at ground level.

By further providing the platform with a main frame portion and an extendable portion, the platform is suited for use with shorter length truck boxes while still permitting the operating linkage to be fully contained within the cargo box in the transport position while being of sufficient length to support longer cargo items thereon in an extended position.

When the truck further comprises a cargo area spanning longitudinally between front and rear ends and laterally between two opposing sides, A rear edge of the extendable portion of the platform may align with the rear end of the cargo area in the retracted position of the transport position.

Preferably rear edge of the extendable portion of the platform aligns with a rear edge of the main portion in the retracted position.

When the platform has a roller proximate the rear edge thereof, the roller is preferably moveable between a working position such that the roller is arranged to roll on the ground as the platform is displaced towards the loading position and a stored position in which the roller is recessed relative to the rear edge of the platform.

There may further be provided at least one biasing member arranged to engage at least one of the platform and the operating linkage so as to bias the platform towards the transport position from the loading position. Preferably the biasing member is a spring on the base frame, engaged by the operating linkage as the platform approaches the loading position.

One embodiment of the invention will now be described in conjunction with the accompanying drawings in which:

BRIEF DESCRIPTION OF THE DRAWINGS

FIG. 6 is a partly sectional elevational view along a laterally centered longitudinal vertical plane in the storage configuration of the lift deck assembly.

FIG. 7 is a partly sectional view according to FIG. 6 in which the extendable portion of the platform is shown extended relative to the stored configuration of FIG. 6 while in the transport position.

FIG. 8 is a partly section view according to FIG. 6 in which the platform is partly deployed between the transport and loading positions thereof.

FIG. 9 is a section view according to FIG. 6 in which the platform is shown in the loading position.

In the drawings like characters of reference indicate corresponding parts in the different figures.

DETAILED DESCRIPTION

Figure 1:
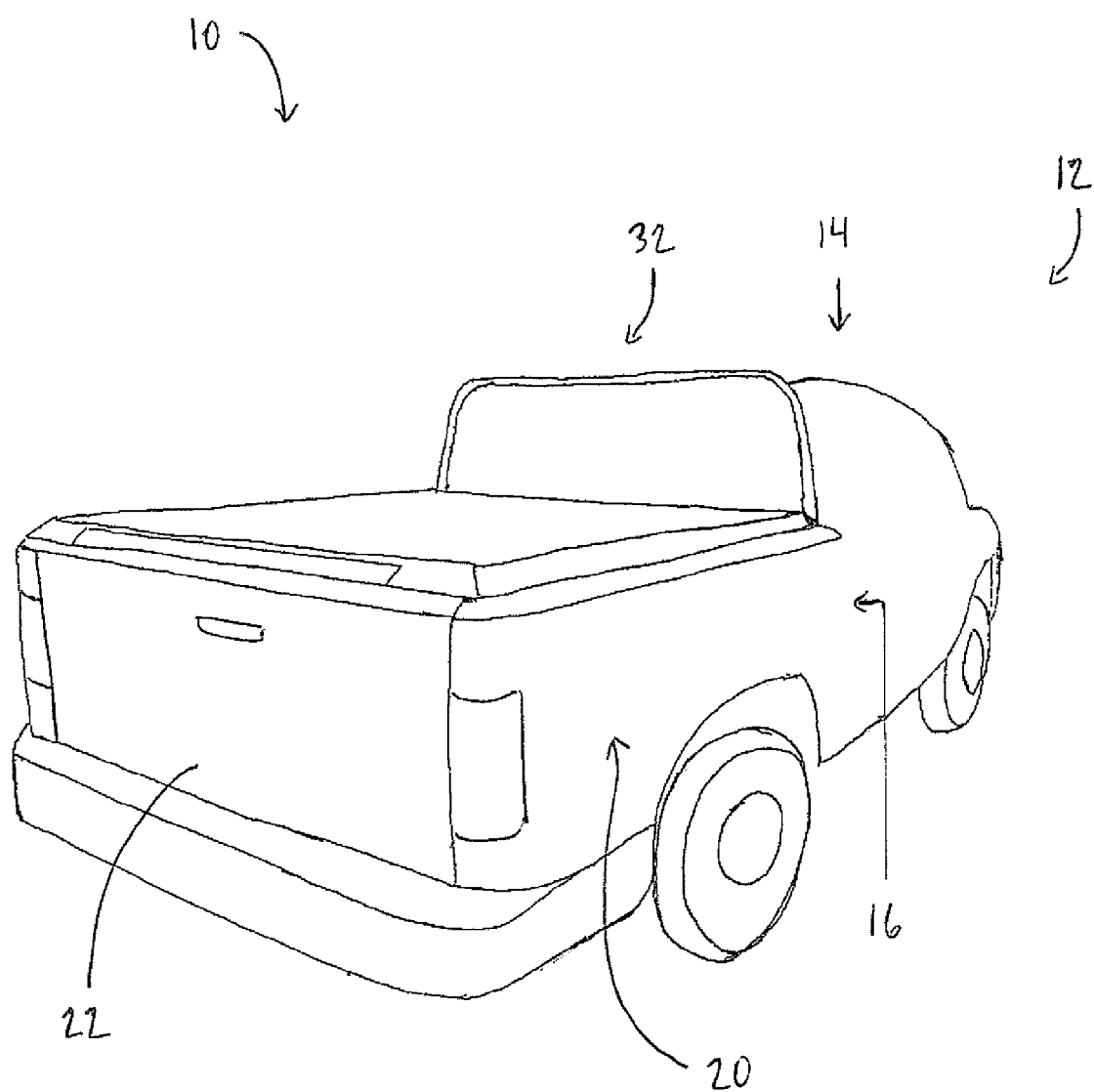
FIG. 1 is a perspective view of the lift deck assembly in a transport position and in a stored configuration.
Figure 2:
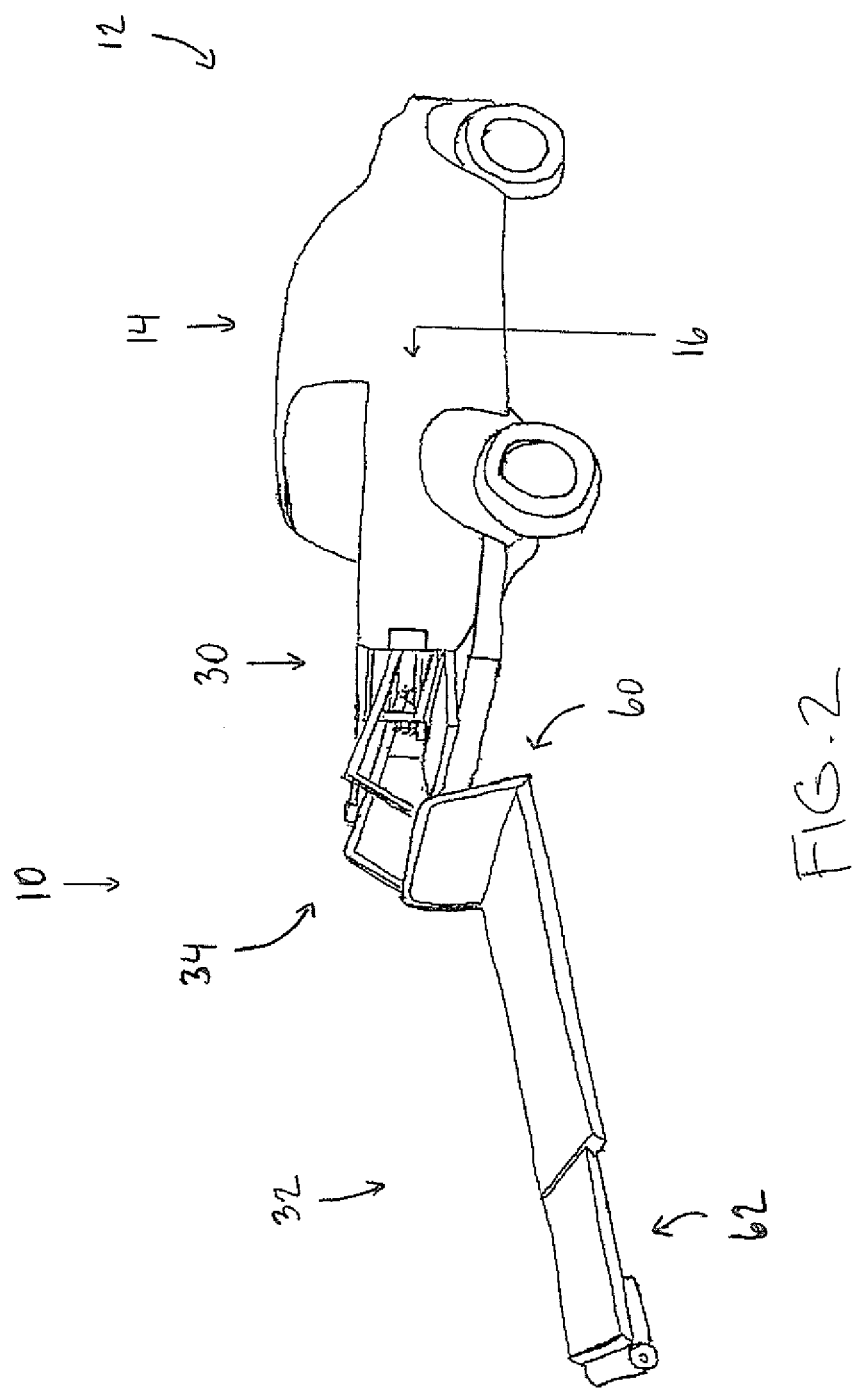
FIG. 2 is a perspective view of the lift deck assembly in a loading position with the platform extended.
Figure 3:
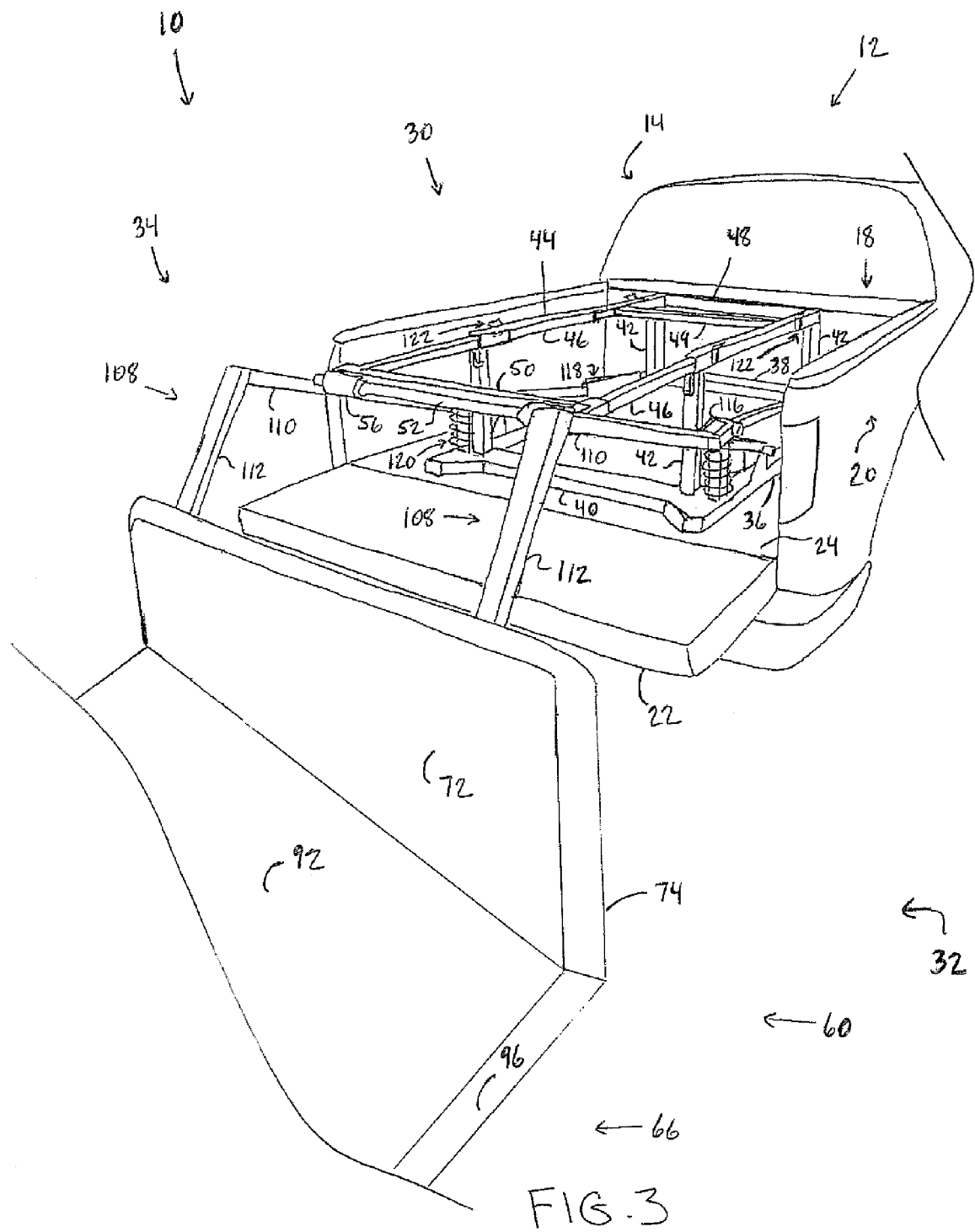
FIG. 3 is a perspective view of the operating linkage in the loading position.
Figure 5:
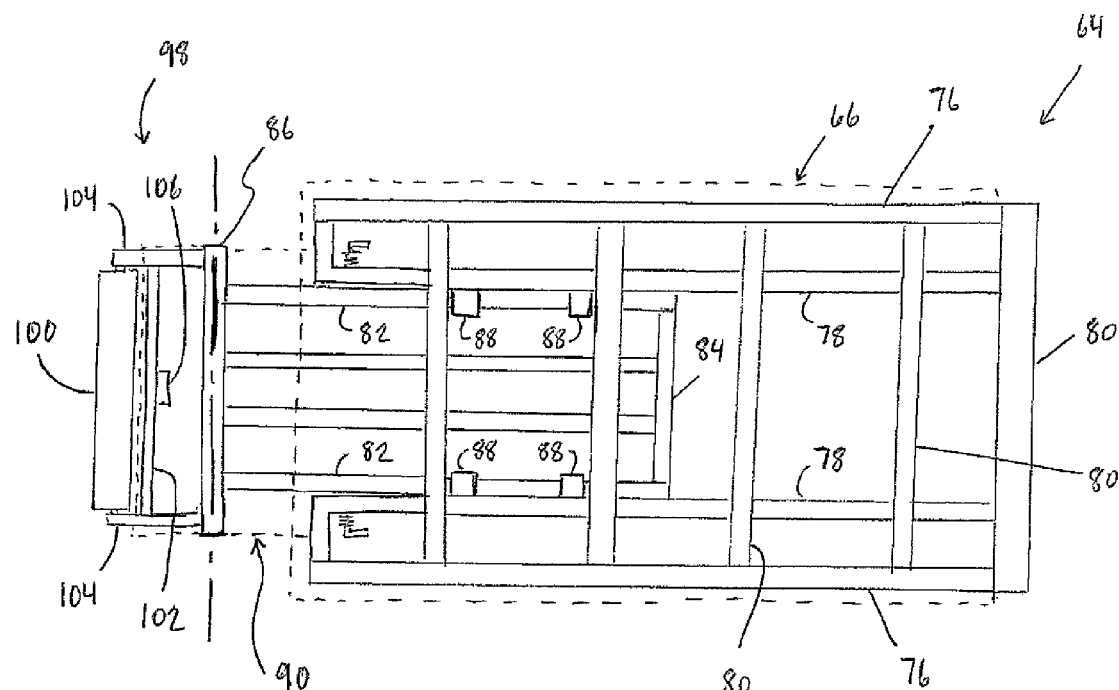
FIG. 5 is a top plan view of the platform with the top sheet of the main portion and the extendable portion shown removed.
Figure 4:
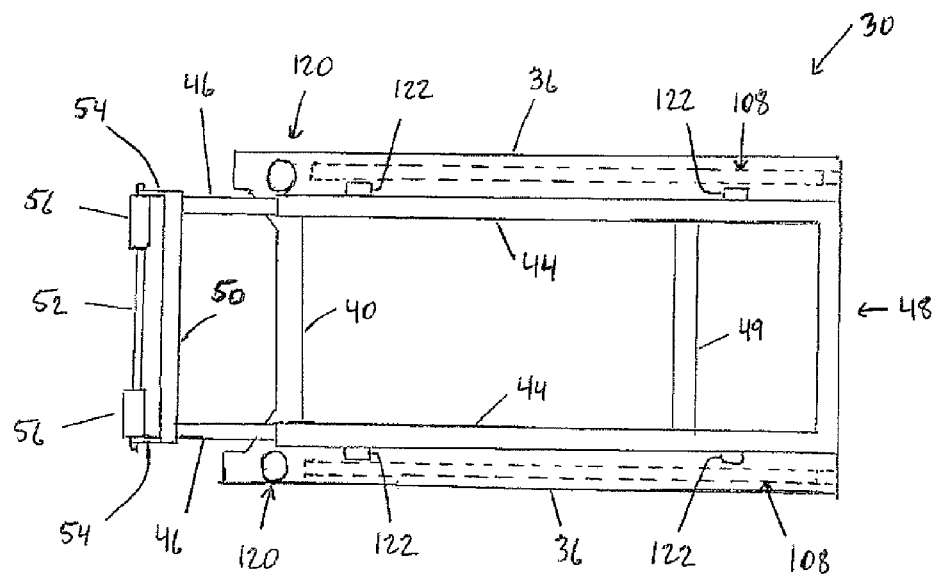
FIG. 4 is top plan view of the base frame with the platform removed therefrom.
Figure 10:
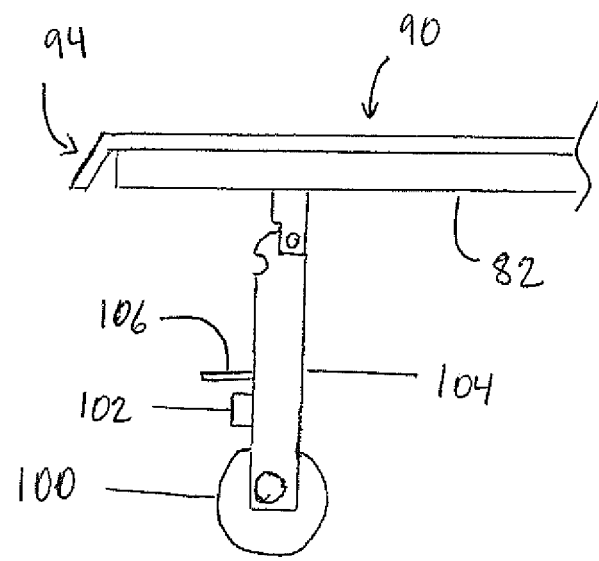
FIG. 10 is a side elevational view of the roller frame at the rear end of the extendable portion of the platform in a stored position.
Figure 11:
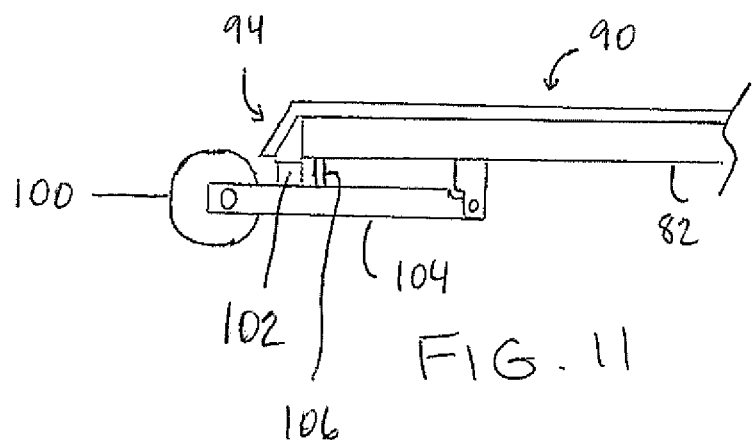
FIG. 11 is a side view of the roller frame according to FIG. 10, shown in a working position.

Referring to the accompanying figures, there is illustrated a lift deck assembly generally indicated by reference numeral 10.

The assembly 10 is particularly suited for use with a passenger truck 12 of the type including a passenger cab 14 towards a front end of the vehicle and a cargo box 16 towards the rear end of the vehicle.

The cargo box is bounded about the perimeter by a front wall 18 at the front end thereof, and two side walls 20 which are parallel and spaced apart to extend longitudinally along opposing sides of the cargo box from the front wall 18 at the front end towards an opposing rear end. The cargo box is accessed through a rear opening between the rear ends of the two side walls 20.

A tailgate 22 is pivotally supported at the rear end of the cargo box for movement between a closed position in which the tailgate is vertically oriented across the rear end of the cargo box, and an open position in which the tailgate extends horizontally rearward from the cargo box, substantially co-planar with a floor 24 of the cargo area. In the absence of any further accessories installed upon the truck, the cargo area remains openly accessible through an open top end thereof between the side walls 20.

The lift deck assembly 10 generally comprises a base frame 30 arranged to be mounted in fixed relation to the truck box, a platform 32 which defines a cargo supporting deck thereon upon which cargo may be supported, and an operating linkage 34 which is coupled between the base frame and the platform such that the platform is moveable relative to the base frame from a ground level loading position substantially at ground level at a location spaced rearwardly from the truck to a transport position in which the platform is supported above the truck box.

In the transport position, various components of the assembly are operable between a working configuration enabling larger cargo items to be supported on the platform and enabling the platform to be displaced between the loading and transport positions, and a stored configuration in which all components of the base frame and operating linkage are concealed within the truck box and the tailgate is unobstructed in its ability to be closed. Furthermore, in the stored configuration, the side edges and the rear edge of the platform are aligned with, adjacent to and overtop of the corresponding top edges of the side walls and the tailgate of the truck box respectively so that the platform fully encloses the open top end of the cargo area of the cargo box which is bounded by the front wall 18, the side walls 20, the tailgate 22, and the floor 24 below the cargo area and provides the general function of a tonneau cover by being supported overtop of the side walls, parallel and spaced above the floor 24 to enclose the operating linkage between the floor below and the platform above.

Turning now to the base frame 30 in more detail, the base frame includes two bottom rails 36 which are parallel and spaced apart so as to extend in the longitudinal forward direction of the truck when mounted in fixed relation onto the floor 24 of the truck box. A front crossbar 38 is connected between the front ends of the bottom rails at the front end of the cargo box and a rear crossbar 40 is connected between the rear ends of the bottom rails in proximity to the rear end of the cargo box. Four posts 42 in a rectangular configuration relative to one another extend upwardly from opposing front and rear ends of the two bottom rails respectively to respective top ends which are lower in elevation than the height of the side walls of the cargo box.

The base frame further includes two top rails 44 which are mounted parallel and spaced apart from one another in a common horizontal plane spaced above the bottom rails so that each top rail 44 is connected between a respective pair of the posts 42 directly above a respective one of the bottom rails 36.

Each top rail comprises an elongate hollow C-channel with open inner side. Each C-channel slidably receives a respective extension rail 46 therein such that the extension rail is longitudinally slidable through an open rear end of the top rail as described in further detail below.

An upper cross bar 48 is connected horizontally between the two top rails 44 at the forward ends thereof to provide additional structural support to the base frame. Each top rail and the respective bottom rail immediately therebelow collectively defines a respective side of the base frame in which the two sides of the base frame are laterally spaced apart from one another so as to be located in proximity to the laterally opposing side walls of the cargo box and to define an open and unobstructed cargo storage area between the two laterally opposed sides of the base frame.

The two extension rails 46 are connected at respective front ends by a front cross member 49 extending through the open inner sides of the top rails, and at respective rear ends by a rear cross member 50 which is fixed between the two extension rails to form a generally rectangular frame. The rear cross member is horizontal and perpendicular to the forward longitudinal direction of the truck and remains in this orientation as the extension rails are slidably displaced relative to the top rails of the base frame.

A support shaft 52 is supported parallel to the rear cross member at a location spaced rearwardly therefrom by a pair of support flanges 54 at laterally opposed ends of the rear cross member. The two support flanges 54 extend rearward from the rear cross member in fixed relation thereto so that the support shaft 52 can be rotatably supported at opposing ends thereof on respective ones of these support flanges.

Two support rollers 56 are supported about the shaft 52 for rotation therewith relative to the base frame. The support rollers 56 are supported at laterally opposed ends of the support staff. Each support roller 56 is in the form of a wheel of resilient material surrounding the shaft and arranged for rolling engagement along respective portions of the platform as the platform is displaced between the loading and transport positions as described in further detail below.

The support rollers 56 are moveable relative to the base frame between a stored position and a working position. In the stored position, the support rollers are in close proximity to the rear ends of the top rails corresponding to the rear end of the base frame at a location spaced forwardly from the rear end of the cargo box so as not to interfere with displacement of the tailgate into the closed position thereof. The support rollers 56 can be displaced rearwardly from the stored position to the working position in which the support rollers are spaced rearwardly from the rear end of the base frame and the rear end of the cargo box by slidably extending the extension rails 46 relative to the respective top rails 44 of the base frame such that the extension rails protrude rearwardly beyond the rear end of the cargo box to locate the support rollers spaced above the open tailgate in use.

Turning now to the platform 32, the platform generally includes a main portion 60 fully spanning the open top end of the cargo box in the stored configuration, and an extendable portion 62, which is longitudinally slidable relative to the main portion between a stored position fully contained within the perimeter boundary of the main portion by locating the rear edges of the main portion and the extendable portion substantially in alignment with one another, and an extended position in which the extendable portion 62 protrudes rearwardly beyond the rear edge of the main portion 60.

The main portion 60 further includes a base frame portion 64 spanning horizontally across the top end of the cargo box in the stored configuration and a rigid metal top sheet 66 spanning the top side of the base frame portion to define a main portion of a deck surface upon which cargo can be supported. The main portion 60 of the platform further includes a head frame portion extending upwardly from the front end of the base frame portion so as to be located coplanar and in close proximity to a rear window of the cab of the truck in the storage configuration.

The head frame portion 68 includes a plurality of upright frame members 70 which lie in a common vertical plane and which extend vertically upward from the front end of the base frame portion. The uprights 70 support a cover sheet 72 to fully span the rear side of the head frame portion. More particularly, the cover sheet 72 has a width corresponding approximately to the full width of the cab of the truck and a full height of the portion of the cab of the truck that protrudes upwardly above the cargo box. The coversheet 72 is substantially rectangular in shape and is bounded at its side edges and top edge by a generally U-shaped roll bar 74 formed of tubular steel.

The base frame portion 64 of the platform includes two side rails 76 extending longitudinally along laterally opposing side edges of the platform between the front and rear ends thereof. Two intermediate rails 78 are mounted parallel to the side rails at intermediate locations such that each intermediate rail is spaced inwardly from one of the side rails 76. The intermediate rails and the side rails lie in a generally common horizontal plane. The intermediate rails 78 are spaced apart from one another so as to be suitably aligned with respective ones of the top rails of the base frame to permit the intermediate rails to be supported directly on top of the respective top rails 44 in the transport position of the assembly.

A plurality of crossbars 80 are connected laterally overtop of the intermediate rails between the two side rails. A forwardmost one of the crossbars 80 is connected across the front ends of the side rails and the intermediate rail onto which the uprights 70 of the head frame portion are fixed to extend upwardly therefrom.

The extendable portion 62 of the platform includes two sliding rails 82 which are mounted parallel and fixed apart from one another to extend longitudinally between a front crossbar 84 at the front end of the extendable portion and a rear crossbar 86 connected between the sliding rails at an opposing rear end of the extendable portion. The lateral width of the front crossbar and the two sliding rails between which it is connected, is arranged to be less than the lateral width between the intermediate rails 78 of the base frame portion such that the rails of the extendable portion are arranged to lie in a common horizontal plane with the rails of the main portion 60.

Two slide collars 88 are mounted along the inner side of each intermediate rail at longitudinally spaced positions thereon in proximity to the rear end thereof. Each pair of slide collars 88 slidably receives a respective one of the sliding rails 82 of the extendable portion 62 of the platform therein.

The extendable portion 62 is slidable from the storage configuration in which the rear cross bar 86 of the extendable portion is in close proximity to the rear end of the base frame portion 64 and the extended position in which the rear cross bar is positioned spaced rearwardly from the rear end of the base frame portion and the rear end of the top sheet 66.

A top sheet 90 is mounted above the frame elements of the extendable portion 62 to define the upper supporting deck surface of the extendable portion 62 in the extended position of the platform.

Each of the top sheet 66 of the main portion 60 and the top sheet 90 of the extendable portion 62 includes a horizontal main portion 92 spanning between front and rear edges thereof and opposing side edges thereof. Each top sheet further includes a rear flange 94 which extends downwardly and rearwardly from the rear end of the main sheet 92 by a height corresponding approximately to the height of the frame elements to assist in concealing the frame elements below the top sheet.

The rear flange 94 of the main portion includes a cutaway opening sized to slidably receive the extendable portion therethrough. In the storage configuration the rear flange 94 of the extendable portion is arranged to be substantially coplanar with the rear flange of the main portion to fully occupy the opening in the rear flange of the main portion.

The top sheet of the main portion 60 further includes side flanges 96 corresponding approximately to the height of the base frame portion 64 so that in the storage configuration of the platform, the bottom edges of the side flanges and the rear flanges all lie in a common plane directly abutted with the top flanges defining the top sides of the side walls and the tailgate of the truck box respectively.

The extendable portion of the platform further includes a roller frame 98 which supports a ground roller 100 thereon such that the ground roller is moveable relative to the frame of the extendable portion between storage and working configurations thereof respectively. The roller frame includes a main cross member 102 which is supported parallel to the rear crossbar 86 of the extendable frame portion. Two pivot arms 104 are fixed onto opposing ends of the main cross member 102 in a generally U-shaped configuration together therewith.

The inner ends of the two pivot arms 104 are pivotally supported on the bottom side of the rear crossbar 86 of the extendable frame portion. In the storage position, the two pivot arms extend downwardly from the inner ends to respective outer ends between which the main cross member 102 is fixed. The ground roller 100 is supported parallel to and adjacent to the main cross member 102 at a location spaced outwardly therefrom by rotatably supporting opposing ends of the ground roller in proximity to the outer ends of the two pivot arms respectively. The ground roller 100 thus spans substantially the full lateral width across the rear end of the extendable frame portion.

The top sheet 90 of the extendable frame portion protrudes rearwardly beyond the rear crossbar 86 such that the rear crossbar 86 is arranged to be positioned forwardly above the tailgate into the interior of the cargo area of the truck in the stored position. In the stored position of the roller frame, the pivot arms thus extend downward from the rear crossbar to locate the ground roller 100 at the bottom end thereof fully contained within the interior of the cargo area without obstructing the tailgate from being closed.

The roller frame remains pivotal such that the ground roller 100 is displaced upwardly and rearwardly from the stored position to the working position. A latch 106 is supported centrally on the main cross member 102 and is arranged to be selectively latched to an underside of the extendable frame portion in proximity to the rear end thereof to retain the roller frame in the working position as desired.

The two pivot arms extend substantially horizontally rearward in the working position. The pivot arms have sufficient length so as to locate the ground roller 100 fully rearward of the rear edge of the top sheet and the remainder of the frame of the extendable frame portion in the working position.

Turning now to the operating linkage, the linkage generally includes two lift arms 108 supported at laterally opposing sides of the base frame. More particularly, each lift arm is supported at the outer side of a respective side of the base frame between the base frame and the corresponding adjacent side wall of the truck box. Each lift arm includes a first arm portion 110 pivotally coupled to a respective one of the bottom rails 36 of the base frame at a first end thereof. The first end of the first arm portion is pivotally coupled to the base frame at a position spaced slightly forward of the rear end of the base frame but closer to the rear end than the front end thereof. In the storage configuration, the first portion 110 of each lift arm extends forwardly at an upward incline to an opposing second end in proximity to the front end of the base frame which is in close proximity to the front end of the truck box.

A second portion 112 of each lift arm extends vertically upward from the second end of the first arm portion 110 in the storage configuration. The second portions 112 are thus fixed to respective ones of the first portions 110 at an obtuse angle therebetween. Each second portion extends from the first portion to an outer end 114 so that an overall length of the second arm portion corresponds approximately to the height of the head frame portion 68. The outer ends 114 of the second arms portions are pivotally connected to the top ends of the uprights 70 of the head frame portion.

In the stored configuration, the second arms portions 112 are in a common vertical plane with the uprights 70 such that the uprights and the second arm portions 112 in turn lie within a common plane with the roll bar 74 which conceals the second arm portions of the linkage within the perimeter boundary thereof. The coversheet 72 of the head frame portion conceals the second arm portions of the linkage from the rear side thereof in the stored configuration. In the stored configuration all components of the linkage are either fully contained within the cargo box or are contained within the perimeter boundary of the roll bar 74 of the head frame portion 68 of the platform so as to be fully concealed.

Each lift arm 108 further includes a crank element 116 at a location spaced along the first arm portion 110 from the first end thereof while remaining closer to the first end than the second end. In the stored configuration, the crank elements extend downwardly from the first arm portions 110 respectively so as to be pivotally coupled to a respective hydraulic actuator 118 at a location spaced below the first arm portion 110.

Each hydraulic actuator 118 comprises a piston cylinder configuration which is linear acting and which extends downwardly and forwardly when in the stored configuration from pivotal connection of the piston end on the respective crank 116 to the opposing cylinder end pivotally coupled to a respective one of the bottom rails 36 of the base frame adjacent to the front end thereof.

When it is desired to store cargo on the deck surface of the lift deck assembly a user first opens the tailgate and extends the extendable frame portion 62 from the stored position to the working position thereof by sliding longitudinally rearward relative to the main portion 60. Suitable spring pins are mounted on respective rails of the base frame portion for cooperation with corresponding apertures in the sliding rails of the extendable frame portion in both the stored and working positions to selectively retain the extendable frame portion in either one of the two opposing positions thereof.

The ground roller 100 is also deployed from the stored position to the working position thereof either before or after deploying the extendable frame portion relative to the main portion of the platform. Subsequent to the extendable portion being extended into the working position thereof, the support rollers 56 of the base frame can be similarly extended from the stored position to the working position thereof.

Once all components are in their working configuration, the hydraulic actuators 118 can be extended from the stored configuration corresponding to the transport position of the platform to displace the platform towards the loading position. The forward end of the platform remains coupled through the head frame portion to the lift arms throughout the deployment to the loading position.

As the platform is initially displaced rearward from the transport position, the rear end of the platform is supported on the support rollers 56 by rolling engagement of the support rollers along the bottom side of the intermediate rails 78 of the base frame portion. As the platform begins to protrude further rearward from the base frame, the platform begins to tilt downwardly and rearwardly until the ground roller 100 at the rear end thereof engages the ground for rolling movement along the ground as the platform is continued to be deployed towards the loading position.

Once the lift arms reach an over-center position extending generally upward from their pivotal mounting locations on the base frame, the platform is then entirely supported at the front end on the lift arms and at the rear end on the ground roller engaged upon the ground such that the platform is no longer supported on the support rollers. As the lift arms are continued to be pivoted rearward towards the loading position, by continued extension of the hydraulic actuators 118, the ground roller 100 rolls rearward along the ground and the platform will eventually reach the loading position shown in FIG. 9 in which the first portions 110 of the lift arms extend generally rearward and the second portions of the lift arms extend generally downwardly from the first portions. As the head frame portion 68 extends downward from the pivotal connection to the lift arms to the base frame portion at the bottom end thereof, the base frame portion can be located in close proximity to the ground for ease of loading cargo substantially at ground level.

When cargo is supported on the upper deck surface of the platform, the platform is returned to the transport position by retracting the hydraulic actuators 118. Typically, the extendable frame portion 62 remains in the extended and working position thereof while supporting cargo thereon. When cargo is unloaded from the platform and it is simply desired to return the platform to a transport position with the remainder of the elements in the stored configuration thereof, the roller frame 98, the extendable frame portion 62, and the support rollers 56 are returned from their working position to their stored positions respectively subsequent to the platform being returned to the transport position supported above the base frame.

The operating linkage further includes two biasing springs 120 mounted on the two base rails 36 of the base frame adjacent the rear end thereof in lateral alignment with respective ones of the two lift arms 108. The springs are arranged to be compressed by the lift arms which are lowered onto the top end of the springs as the lift arms approach the loading position of the assembly. Accordingly, in the loading position, the springs are compressed and provide an upward biasing force to assist in returning the base frame from the loading position towards the transport position. The springs 120 act primarily to provide a cushioning or dampening effect as the platform approaches the loading position.

The operating linkage further includes a set of guide flanges 122 in the form of two guide flanges mounted at longitudinally spaced positions on each top rail 44. Each guide flange is fixed to the outer side of the respective top rail to extend upwardly therefrom at an outward inclination by a height corresponding approximately to the thickness of the base frame portion. The guide flanges define inner guide surfaces which are sloped downwardly and inwardly from the upper free edges thereof to the bottom ends thereof at the outer sides of the top rails 44. At the top ends of the guide flanges, distance between the guide flanges of one top rail and the other top rail in the lateral direction is arranged to be greater than the width between the outer sides of the two intermediate rails 78 of the base frame portion. The lateral distance between the guide flanges of one top rail and the guide flanges of the other top rail however converges downwardly and inwardly to be reduced towards the bottom ends of the guide surfaces where the lateral distance therebetween corresponds approximately to the lateral distance between the outer sides of the intermediate rails 78.

In this instance, as the intermediate rails 78 of the base frame portion are lowered onto the top rails 44 of the base frame, as the platform approaches the transport position, any lateral misalignment of the intermediate rails 78 relative to the top rails of the base frame will result in one of the intermediate rails 78 engaging the inner guide surfaces of a corresponding pair of guide flanges 122 which will direct the intermediate rails into alignment with the top rails which further forces the platform into lateral alignment relative to the base frame in the transport position. More particularly, this alignment ensures that the platform is always laterally centered relative to the side walls of the truck box in the stored configuration for an optimal finished appearance of the platform relative to the truck box. Furthermore, the corresponding side edges of the platform are ensured to be properly aligned with the side walls of the truck box to ensure a close weatherproof relationship therewith in the stored configuration.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A lift deck assembly for a truck having a cargo box including a cargo area contained between laterally opposed sidewalls extending longitudinally between a front of the cargo box and a tailgate at a rear of the cargo box, the assembly comprising:

a platform extending laterally between two side edges and longitudinally between opposite front and rear edges and being arranged to support a load thereon;

a base frame arranged for anchoring within the cargo area of the cargo box in fixed relation to the cargo box;

an operating linkage coupled between the base frame and the platform such that the platform is arranged to be moveable from a loading position substantially at ground level to a transport position above the sidewalls of the cargo box;

the platform being sized and shaped such that in the transport position the side edges of the platform are adjacent to and overtop of respective top edges of the sidewalls of the cargo box and the rear edge of the platform is adjacent to and overtop of a top edge of the tailgate such that the platform defines a tonneau cover arranged for enclosing the operating linkage within the cargo area between a floor of the cargo box below the cargo area and the platform above the cargo area; and a roller on the base frame proximate a rear end of the base frame, the roller being moveable between a working position in which the roller protrudes rearwardly beyond a rear end of the cargo box so as to be arranged for rolling engagement with the platform so as to support the platform thereon as the platform is displaced towards the transport position and a stored position in which the roller is recessed forwardly relative to the working position so as to be arranged to be fully enclosed within the cargo area of the cargo box.

2. The lift deck assembly in claim 1, wherein the platform has a base frame portion coupled to the operating linkage and a sheet above the base frame portion, the sheet having a smooth, continuous, and uninterrupted surface spanning between the two side edges of the platform.

3. The lift deck assembly in claim 1, wherein the platform comprises a frame having a base frame portion coupled to the operating linkage and a head frame portion extending upwards from the base frame portion at the front edge of the platform, the head frame portion having a panel configured to conceal a portion of the operating linkage in the transport position.

4. The lift deck assembly in claim 3, wherein the panel of the head frame portion spans the full width of the cargo box.

5. The lift deck assembly in claim 1, further comprising at least one biasing member arranged to engage at least one of the platform and the operating linkage so as to bias the platform towards the transport position from the loading position.

6. The lift deck assembly in claim 5, wherein the biasing member is a spring on the base frame, engaged by the operating linkage as the platform approaches the loading position.

7. A lift deck assembly for a truck having a cargo box including a cargo area contained between laterally opposed sidewalls extending longitudinally between a front of the cargo box and a tailgate at a rear of the cargo box, the assembly comprising:

a platform extending laterally between two side edges and longitudinally between opposite front and rear edges and being arranged to support a load thereon;

a base frame arranged for anchoring within the cargo area of the cargo box in fixed relation to the cargo box;

an operating linkage coupled between the base frame and the platform such that the platform is arranged to be moveable from a loading position substantially at ground level to a transport position above the sidewalls of the cargo box;

the platform being sized and shaped such that in the transport position the side edges of the platform are adjacent to and overtop of respective top edges of the sidewalls of the cargo box and the rear edge of the platform is adjacent to and overtop of a top edge of the tailgate such that the platform defines a tonneau cover arranged for enclosing the operating linkage within the cargo area between a floor of the cargo box below the cargo area and the platform above the cargo area; and a roller on the platform proximate the rear edge of the platform, the roller being moveable between a working position in which the roller protrudes rearwardly beyond the rear edge of the platform such that the roller is arranged to roll on the ground as the platform is displaced towards the loading position and a stored position in which the roller is recessed forwardly relative to the rear edge of the platform so as to be arranged to be fully enclosed within the cargo area of the cargo box.

8. The lift deck assembly in claim 1, wherein the base frame has guide surfaces arranged for engaging the platform so as to guide the platform laterally inwardly to a central position relative to the cargo box as the platform is displaced towards the transport position.

9. The lift deck assembly in claim 1, wherein the platform has a main portion defining the side edges and an extendable portion, the extendable portion being moveable relative to the main portion between a retracted position and an extended position that extends rearward from the main portion so as to be further rearward than in the retracted position, the extendable portion being arranged to support at least a portion of the load thereon in the extended position of the extendable portion and in the transport position of the main portion of the platform.

10. The lift deck assembly in claim 9, wherein a rear edge of the extendable portion is above and adjacent to a top edge of the tailgate in the retracted position of the extendable portion and of the transport position of the platform.

11. The lift deck assembly in claim 9, wherein a rear edge of the extendable portion aligns with a rear edge of the main portion in the retracted position.

12. A lift deck assembly for a truck having a cargo box including a cargo area contained between laterally opposed sidewalls extending longitudinally between a front of the cargo box and a tailgate at a rear of the cargo box which is operable between open and closed positions, the assembly comprising:

a platform extending laterally between two side edges and longitudinally between opposite front and rear edges and being arranged to support a load thereon, the platform having a main portion defining the side edges and an extendable portion, the extendable portion being moveable relative to the main portion between a retracted position and an extended position that extends rearward from the main portion so as to be further rearward than in the retracted position, the extendable portion being arranged to support at least a portion of the load thereon in the extended position;

a base frame arranged for anchoring within the cargo area of the cargo box in fixed relation to the cargo box;

an operating linkage coupled between the base frame and the platform for moving the platform from a loading position substantially at ground level to a transport position above top edges of the sidewalls of the cargo box such that the extendable portion can be positioned in the extended position when the tailgate is closed; and a roller on the platform proximate the rear edge of the platform, the roller being moveable between a working position in which the roller protrudes rearwardly beyond a rear edge of the extendable portion such that the roller is arranged to roll on the ground as the platform is displaced towards the loading position and a stored position in which the roller is recessed forwardly relative to the rear edge of the main portion of the platform so as to be arranged to be fully received within the cargo area of the cargo box.

13. The lift deck assembly in claim 12, wherein a rear edge of the extendable portion of the platform is arranged to be located above and in proximity to a top edge of the tailgate in the closed position of the tailgate when the platform is in the transport position and the extendable portion is in the retracted position.

14. The lift deck assembly in claim 12, wherein a rear edge of the extendable portion of the platform aligns with a rear edge of the main portion in the retracted position.

15. The lift deck assembly in claim 12, further comprising at least one biasing member arranged to engage at least one of the platform and the operating linkage so as to bias the platform towards the transport position from the loading position.

16. The lift deck assembly in claim 15, wherein the biasing member is a spring on the base frame, engaged by the operating linkage as the platform approaches the loading position.

* * * * *